(12) United States Patent
Kubota et al.

(10) Patent No.: US 7,862,177 B2
(45) Date of Patent: Jan. 4, 2011

(54) IMAGE FORMING SYSTEM

(75) Inventors: Tomoki Kubota, Okazaki (JP);
Hidefumi Okabe, Okazaki (JP)

(73) Assignee: AISIN AW Co., Ltd., Aichi (JP)

( * ) Notice: Subject to any disclaimer, the term of this patent is extended or adjusted under 35 U.S.C. 154(b) by 564 days.

(21) Appl. No.: 11/798,207

(22) Filed: May 11, 2007

(65) Prior Publication Data
US 2007/0280503 A1 Dec. 6, 2007

(30) Foreign Application Priority Data
May 31, 2006 (JP) .............................. 2006-152510

(51) Int. Cl.
*B60Q 1/34* (2006.01)
*G03B 21/00* (2006.01)

(52) U.S. Cl. .................... 353/13; 382/104; 250/221; 701/72; 340/465

(58) Field of Classification Search ................ 353/11, 353/12, 13; 382/103, 104; 250/221, 222.2; 701/72, 301; 340/465, 903, 988, 995.2
See application file for complete search history.

(56) References Cited
U.S. PATENT DOCUMENTS
2005/0117364 A1 6/2005 Rennick et al. ............. 362/540
2005/0143889 A1* 6/2005 Isaji et al. ...................... 701/70
2006/0114125 A1 6/2006 Kubota et al. ............... 340/905
2008/0253615 A1* 10/2008 Kubota et al. ............... 382/104

FOREIGN PATENT DOCUMENTS
| JP | 2004-102889 | 4/2004 |
| JP | 2005-161977 | 6/2005 |
| JP | 2005157873 | 6/2005 |
| JP | 2006085313 | 3/2006 |

* cited by examiner

*Primary Examiner*—Kevin Pyo
(74) *Attorney, Agent, or Firm*—Bacon & Thomas, PLLC (57) ABSTRACT

When it is determined that the host vehicle is stopped at the intersection in the right turn waiting state, the navigation ECU forms a right turn waiting mark representing the right turn waiting state on the road surface of the opposing lane at the intersection where the host vehicle is stopped with a visually identifiable laser beam with a predetermined color. When it is determined that the host vehicle is brought into the right turn start state from the right turn waiting state where the host vehicle is stopped at the intersection, the navigation ECU forms the right turn start mark representing the right turn start state instead of the right turn waiting mark on the road surface of the opposing lane at the intersection where the host vehicle enters with the visually identifiable laser beam with the color (for example, red) different from that of the right turn waiting mark, at substantially the same position thereof in accordance with the traveling state of the host vehicle.

8 Claims, 8 Drawing Sheets

IMAGE FORMING SYSTEM

INCORPORATION BY REFERENCE

The disclosure of Japanese Patent Application No. 2006-152510 filed on May 31, 2006, including the specification, drawings and abstract is incorporated herein by reference in its entirety.

BACKGROUND OF THE INVENTION

1. Field of the Invention

The present invention relates to an image forming system installed in a vehicle to form a mark with a predetermined shape on a road surface ahead of the vehicle.

2. Description of the Related Art

Various types of image forming systems installed in the vehicle to form a mark with a predetermined shape on a road surface ahead of the vehicle have been introduced.

In the vehicle detection device disclosed in, for example, Japanese Patent Application Publication No. 2004-102889 (from the paragraph [0011] to [0029] in FIGS. I to 6), the host vehicle and another vehicle form irradiation images which are oblong along the traveling direction on the road surface ahead of the respective vehicles using laser beams such that the movement direction and speed of the irradiation image of the other vehicle in the dead zone are detected to alert the drivers to the potential risk.

However, the vehicle detection device as described above is structured to inform the driver of the traveling state of the other vehicle by detecting the movement direction and the speed of the irradiation image of the other vehicle. It is difficult for the aforementioned vehicle detection device to detect the timing at which the other vehicle in the stopped state is going to start.

SUMMARY OF THE INVENTION

It is an object of the present invention to provide an image forming system capable of informing the other vehicle of the timing at which the host vehicle is going to start by detecting the driver's operation of the host vehicle.

In the image forming system according to a first aspect of the present invention, in the case where it is detected that the state of the subject (host) vehicle stopped at an intersection has changed from the right turn waiting state to the right turn start state, the image forming unit is driven to form the right turn start mark of the predetermined shape, representing the right turn start state, on the road surface of the opposite lane (lane of opposing traffic) at the intersection which the host vehicle will cross.

The driver of the other vehicle in the opposite lane is allowed to easily recognize that the stopped host vehicle has changed from the right turn waiting state to the right turn start state by detecting the right turn start mark with the predetermined shape. Then, the other vehicle may stop before entering the intersection so as to avoid the collision or minor accident with the host vehicle.

In the image forming system according to a second aspect of the present invention, in the case where it is detected that the host vehicle stopped at the intersection is in the right turn waiting state, the image forming unit forms the right turn waiting mark with the predetermined shape representing the right turn waiting state on the road surface of the opposing traffic lane at the intersection where the host vehicle is stopped.

The driver of a vehicle in the opposing traffic lane can easily recognize that the host vehicle stopped at the intersection is in the right turn waiting state by detecting the right turn waiting mark with the predetermined shape. This makes it possible to estimate right turn of the host vehicle, and accordingly, the other vehicle is able to decelerate before entering the intersection so as to avoid a collision or minor accident with the host vehicle.

In the image forming system according to a third aspect of the present invention, the right turn start mark is formed on the position where the right turn waiting mark has been formed. The color or the shape of the right turn start mark may be made different from the color or the shape of the right turn waiting mark.

In the case where the other vehicle on the opposite lane detects the right turn waiting mark with the predetermined shape, the right turn start mark may be easily identified by looking at the same position as the right turn waiting mark. As the color or the shape of the right turn start mark may be made different from the color or the shape of the right turn waiting mark, the other vehicle on the opposite lane is allowed to immediately identify the state where the host vehicle is going to start turning right. This makes it possible to avoid a collision or minor accident with the host vehicle.

In the image forming system according to a fourth aspect of the present invention, in the case where it is detected that a leading vehicle that is turning right exists ahead of the host vehicle, the right turn start mark is not formed. This allows the driver of the other vehicle in the opposing lane to easily see that the host vehicle is going to start turning right following the leading vehicle. This makes it possible to avoid a collision or minor accident with the host vehicle.

In the image forming system according to a fifth aspect of the present invention, in the case where it is detected that a leading vehicle that is turning right is ahead of the host vehicle, the right turn waiting mark is not formed. This allows the driver of the other vehicle in the opposing lane to easily see that the host vehicle is turning right following the leading vehicle without waiting for turning right. This makes it possible to avoid a collision or minor accident with the host vehicle.

In the image forming system according to a sixth aspect of the present invention, in the case where it is detected that the host vehicle has passed around the image forming position where the right turn start mark is formed, formation of the right turn start mark ends. The driver of the other vehicle, in the opposing lane is allowed to easily see that the host vehicle has passed the intersection.

DETAILED DESCRIPTION OF THE PREFERRED EMBODIMENTS

The image forming system according to the present invention will be described with respect to a laser image forming system, by way of example, referring to the drawings.

Embodiment

First, the structure of the laser image forming system according to an embodiment of the present invention will be described referring to FIG. 1.

Figure 1:
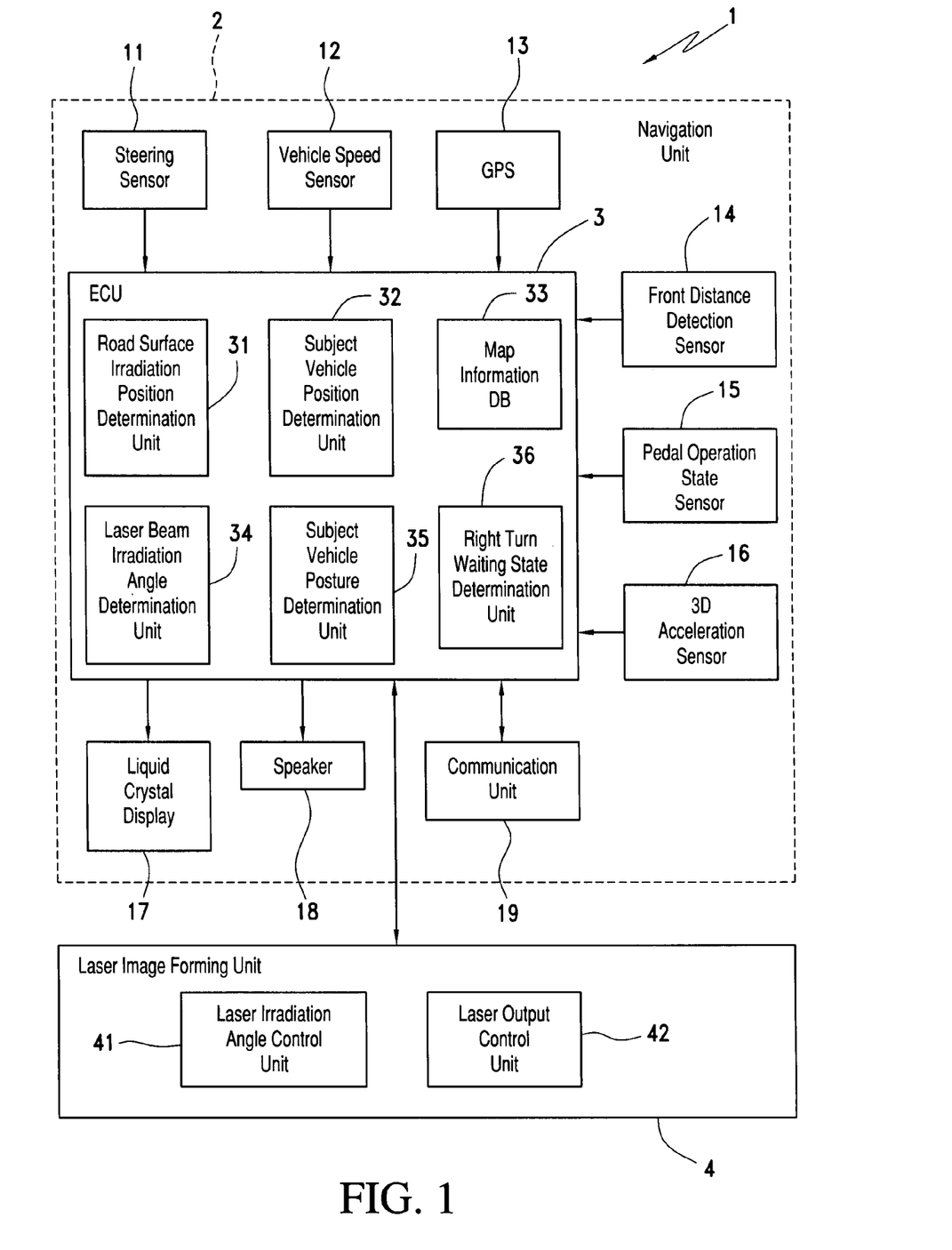
FIG. 1 is a block diagram showing a laser image forming system according to an embodiment of the present invention.

Referring to FIG. 1, the laser image forming system 1 basically includes a navigation unit 2 and a laser image forming unit 4, electrically coupled with the navigation unit 2, as well as peripheral units connected to various control units.

The navigation unit 2 which is installed in a center console or a panel surface of the vehicle interior displays the map and the search route to the destination on a liquid crystal display 17, and outputs voice guidance for the guide route through a speaker 18. In the case where a predetermined condition is satisfied, the navigation unit 2 transmits the control signal to the laser image forming unit 4 to execute the laser image forming process to form the mark of irradiation with a predetermined shape on the road surface ahead of the vehicle in the travelling direction. The laser image forming unit 4 is structured to irradiate the visually identifiable laser beam from the vehicle width center of the front grille of the host vehicle onto the road surface or the road sign ahead of the host vehicle and to change the irradiation direction, irradiation range, irradiation amount or color.

Various components which form the navigation unit 2 will be described hereinafter.

The navigation unit 2 includes a navigation ECU (Electronic Control Unit) 3 which executes various calculations based on the input information, a steering sensor 11, a GPS 13, a 3D acceleration sensor 16, the liquid crystal display 17 installed in the center console or the panel surface of the vehicle interior to display the map and the route guide to the destination, the speaker 18 which outputs the voice guidance for the guide route, and a communication unit 19 that communicates with the information center, for example, VICS™ (Vehicle Information and Communication System). The navigation ECU 3 is connected to a vehicle speed sensor 12 which detects a travelling speed of the host vehicle, a front distance detection sensor 14 which measures the distance to the object ahead by outputting ultrasound from the vehicle width center of the front grille of the host vehicle, a pedal operation state sensor 15 which detects the operation of the driver's foot around the vehicle operation pedal using an image recognition sensor and a behavior sensor, through image processing performed by the CCD camera, and the laser image forming unit 4.

Besides execution of the regular routines of the route searching and route guiding, the navigation ECU 3 executes the laser image forming process to form the right turn waiting mark on the road surface of the opposing lane at the intersection with a visually identifiable laser beam when the host vehicle is stopped at the intersection waiting for turning right, and to form the right turn start mark at the position where the right turn waiting mark has been formed when the vehicle starts turning right. The detailed explanation with respect to the structure of the navigation ECU 3 will be described later.

The navigation ECU 3 allows the steering sensor 11, the GPS 13, the 3D acceleration sensor 16 and the like to detect the current position (hereinafter referred to as the host vehicle position), direction, and the travelling distance from a predetermined point.

Specifically, the steering sensor 11 detects a steering angle of the host vehicle. An optical rotation sensor attached to a rotating portion of the steering wheel (not shown), a rotation resistance sensor, an angle sensor attached to the vehicle wheel and the like may be employed as the steering sensor 11. The GPS 13 detects the current position of the host vehicle and the current time, based on radio waves emitted from the satellite to obtain the host vehicle direction. The 3D acceleration sensor 16 detects the acceleration of the host vehicle in the tri-axial direction. The acceleration detected by the 3D acceleration sensor 16 is integrated to obtain the speed and the travel distance of the host vehicle in the tri-axial direction.

The navigation ECU 3 includes various inner memory units in addition to the CPU used as a working memory for performing various calculation operations, as well as overall control of the navigation unit 2 as the calculation/control unit, a RAM which stores the route data resulting from the route searching, a program for controlling, a route guide program for searching the route to the destination and guiding the driver the route determined by the search, and a ROM which stores the laser image forming program (see FIG. 2) for forming a right turn waiting mark with the visually identifiable laser beam on the road surface of the opposing lane at the intersection when the host vehicle is stopped waiting to turn right at the intersection, and further forming the right turn start mark on the position where the right turn waiting mark has been formed. A semiconductor memory, a magnetic core or the like may be employed as the RAM and ROM. An MPU may be employed as the calculation/control unit instead of the CPU.

The navigation ECU 3 includes a road surface irradiation position determination unit 31, a host vehicle position determination unit 32, a map information DB 33, a laser irradiation angle determination unit 34, a host vehicle posture determination unit 35, and a right turn waiting state determination unit 36 for execution of various control operations based on the information derived from the steering sensor 11, the vehicle speed sensor 12, the GPS 13, the front distance detection sensor 14, the pedal operation state sensor 15, the 3D acceleration sensor 16 and the like.

The road surface irradiation position determination unit 31 calculates the coordinate data of the target image forming position at which the mark with a predetermined irradiation shape is formed on the road surface of the opposing lane at the intersection based on the map information for the opposing lane at the intersection to be stored in the map information DB 33.

The host vehicle position determination unit 32 detects a current absolute position of the host vehicle (latitude and longitude) based on various items of information data derived from the steering sensor 11, the vehicle speed sensor 12, the GPS 13, the 3D acceleration sensor 16. The host vehicle position determination unit 32 detects the existence of a leading vehicle ahead of the host vehicle based on the information derived from the front distance detection sensor 14.

The map information DB 33 includes the data required for the route guidance and the map display, for example, newly built road information, map display data for displaying the map, intersection data, node data, road link data as one of the facilities, the search data for searching the route, shopping data with respect to a POI (Point of Interest) as one of the facilities, and the retrieving data for retrieving the point. The contents of the map information DB 33 may be updated by downloading the update information delivered from the map information delivery center (not shown) via the communication unit 19.

The laser irradiation angle determination unit 34 calculates the laser irradiation angle at which the mark with the predetermined irradiation shape is formed, based on the target image forming position at which the mark with the predetermined irradiation shape is formed on the road surface of the opposing lane at the intersection, which has been determined by the road surface irradiation position determination unit 31, the coordinate position data of the host vehicle at the intersection, which have been determined by the subject position determination unit 32, and the direction information, which represents the direction of the host vehicle at the intersection, and which has been determined by the host vehicle posture determination unit 35.

The host vehicle posture determination unit 35 detects the current direction angle of the host vehicle based on the various information data derived from the steering sensor 11, the vehicle speed sensor 12, the GPS 13, and the 3D acceleration sensor 16.

The right turn waiting state determination unit 36 detects whether or not the driver's foot has moved from the brake pedal to the accelerator pedal by monitoring the driver's foot movement based on the information derived from the pedal operation state sensor 15, so as to determine whether the host vehicle is in the right turn waiting state or in the right turn start state.

The map display data is divided into: four parts (½ of length), sixteen parts (¼), and 64 parts (⅛), based on the secondary mesh for each with 10 km×10 km section. The respective units are set such that each data size becomes substantially the same level. The smallest unit obtained by the division into 64 parts has the size of about 1.25 km×1.25 km.

The node data includes data such as a fork in the road (including intersection and T-shaped intersection), the coordinate (position) of the node points set at predetermined intervals on the road in accordance with the radius of curvature, attributes associated with each node representing whether the node corresponds to an intersection, a connection link number list, i.e., a link ID list of the identification numbers of the links connected to the node, an adjacent node number list as a list of the numbers of the adjacent nodes connected via the link, and the heights of the respective nodes (altitude).

Recorded as the link data are the data with respect to the links that form the road including the road width, gradient, cant, bank, road surface condition, the number of lanes, the point at which the number of lanes is reduced, the point at which the road width is narrowed, and the rail crossing, the data with respect to the corner including the radius of curvature, the intersection, T-shaped intersection, the entrance/exit of the corner, the data with respect to the attributes associated with the road including the downhill road and the uphill road, the data with respect to the road category including the general road such as the national road, prefectural road, and narrow street, and the toll road such as expressways, the urban expressways, ordinary toll roads, and the toll bridges. The data with respect to the toll road including the service road (ramp) of the entrance/exit of the toll road, and the toll booth (interchange) are further recorded.

The data used for searching and displaying the set route (guide route) to the destination are recorded as the search data, which include the cost data formed of the cost for the passage of the node (hereinafter referred to as the node cost), and the cost for the link which forms the road (hereinafter referred to as the link cost) so as to calculate the search cost, and the route display data for displaying the guide route selected through the route searching on the map of the liquid crystal display 17.

The data with respect to the POT, for example, hotels, hospitals, gas stations, parking stations, and tourist facilities in the respective areas are recorded as the shop data together with the ID which specifies the POI. The map information DB 33 stores the voice output data for outputting the predetermined information through the speaker 18 of the navigation unit 2.

The liquid crystal display 17 displays the operation guide, the operation menu, the key guide, the guide route from the present position to the destination, the guide information along the guide route, the traffic information, news, weather forecast, time, mail, and the TV programs and the like. Instead of the liquid crystal display 17, a CRT display or a plasma display or the like may be employed. Alternatively, a hologram device or the like for emitting a hologram onto the windshield of the vehicle may be employed.

The speaker 18 outputs the voice guidance which guides the driver along the guide route based on the instruction from the navigation ECU 3. For example, such message as "please turn right at the XX intersection 200 m ahead" will be output as the voice guidance. The sound output through the speaker 18 may be various sound effects and various types of guide information which have been preliminarily recorded in the tape or the memory, in addition to synthetic sound.

The communication unit 19 is a communication device which communicates with the map information delivery center so as to transmit/receive the latest version of update map information thereto/therefrom. In addition to the map information delivery center, for example, the traffic information including the traffic congestion information, the traffic regulation information, parking information, traffic accident information, and the information of the crowded condition in the service area transmitted from the road traffic information center (VICS) are received as the radio wave beacon, and the optical beacon through the radio wave beacon device, and the optical beacon device provided alongside the road. The communication unit 19 is a network unit which allows communication in the communication system for the communication line network, for example, LAN, WAN, intranet, cell phone line network, phone line network, public communication line network, private communication line network, and internet. The communication unit 19 includes an FM receiver which receives the FM multiplex information, including the news and weather forecast, in addition to the information delivered from the road traffic information center (VICS) via the FM broadcast station. The beacon receiver and the FM receiver are combined into the unit as a VICS receiver. However, they may be separately installed.

The laser image forming unit 4 includes a laser irradiation angle control unit 41 which controls the irradiation angle of the laser beam for forming the image of the predetermined irradiation shape based on the laser irradiation angle information transmitted from the navigation ECU 3, and a laser output control unit 42 that controls the output of the laser beam based on the color data for the mark transmitted from the navigation ECU 3 to be formed on the road surface.

The laser image forming process for forming the right turn waiting mark with the visually identifiable laser beam on the road surface of the opposing lane at the intersection, which is executed by the navigation ECU 3 of the thus structured laser image forming system 1 when the host vehicle is stopped at the intersection waiting to turn right will be described referring to FIGS. 2 to 8.

Figure 2:
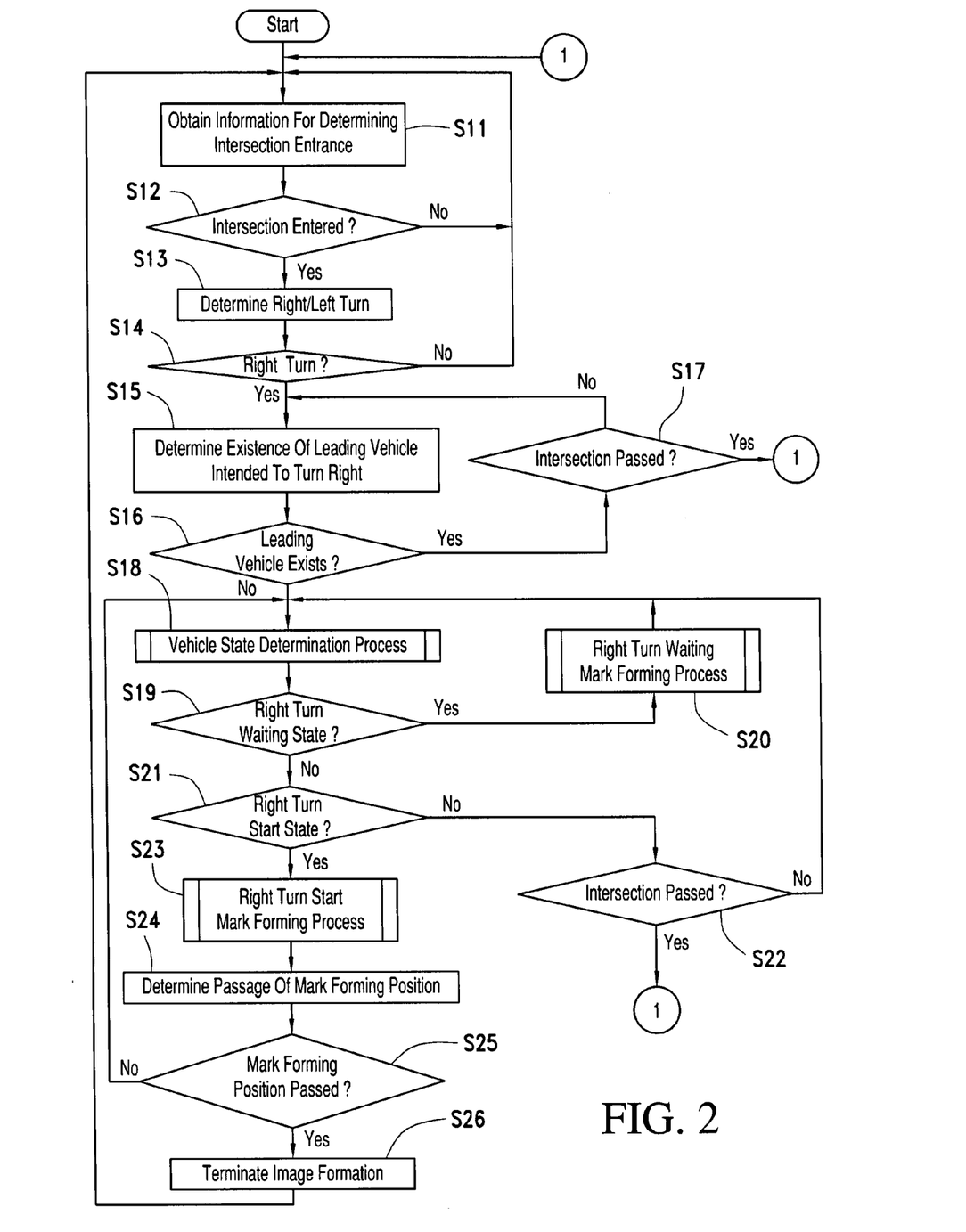
FIG. 2 is a flowchart of a laser image forming process executed by a navigation ECU.
Figure 3:
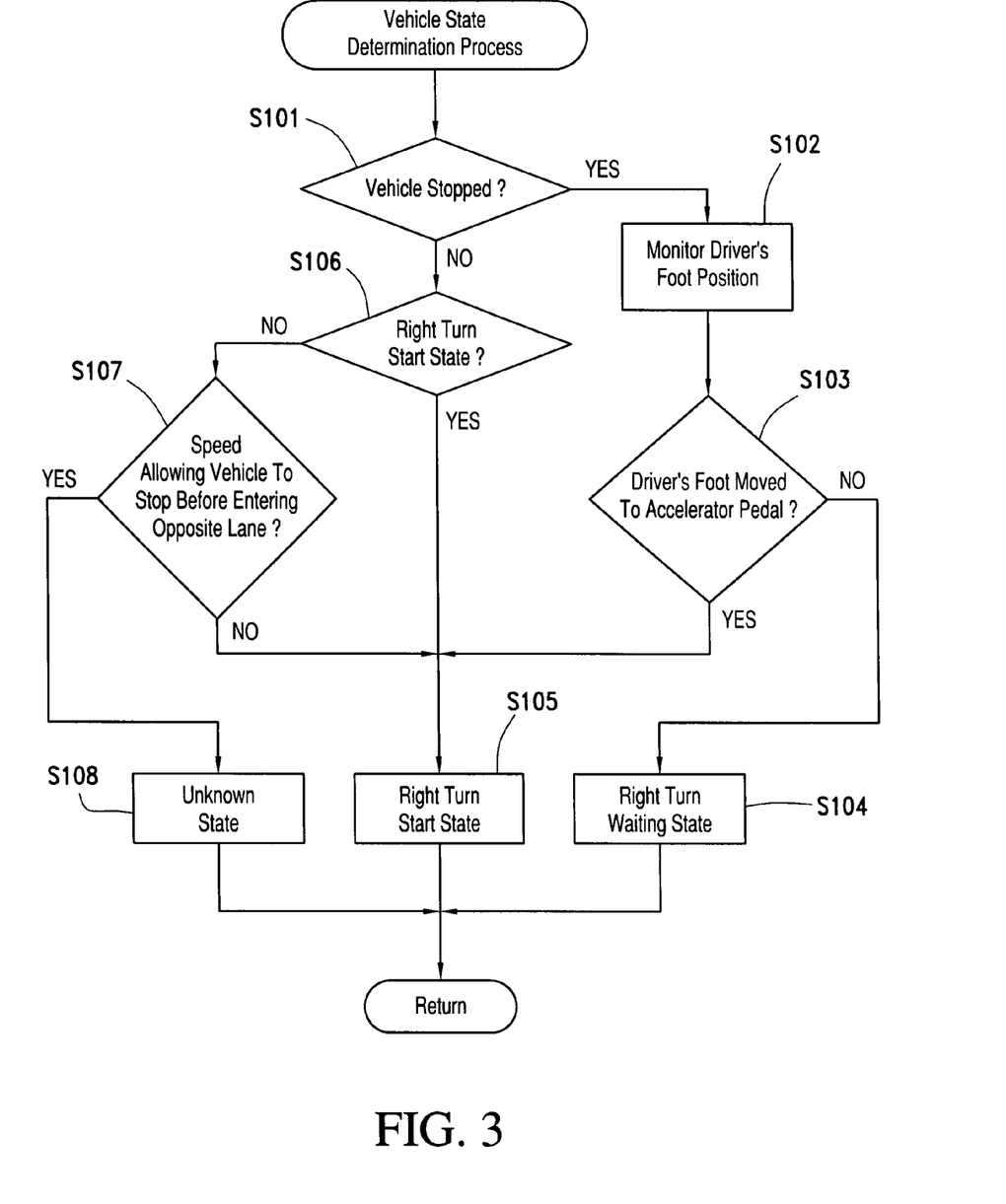
FIG. 3 is a flowchart of a subroutine as the "vehicle state determination process" subroutine executed in step 18 shown in FIG. 2.
Figure 4:
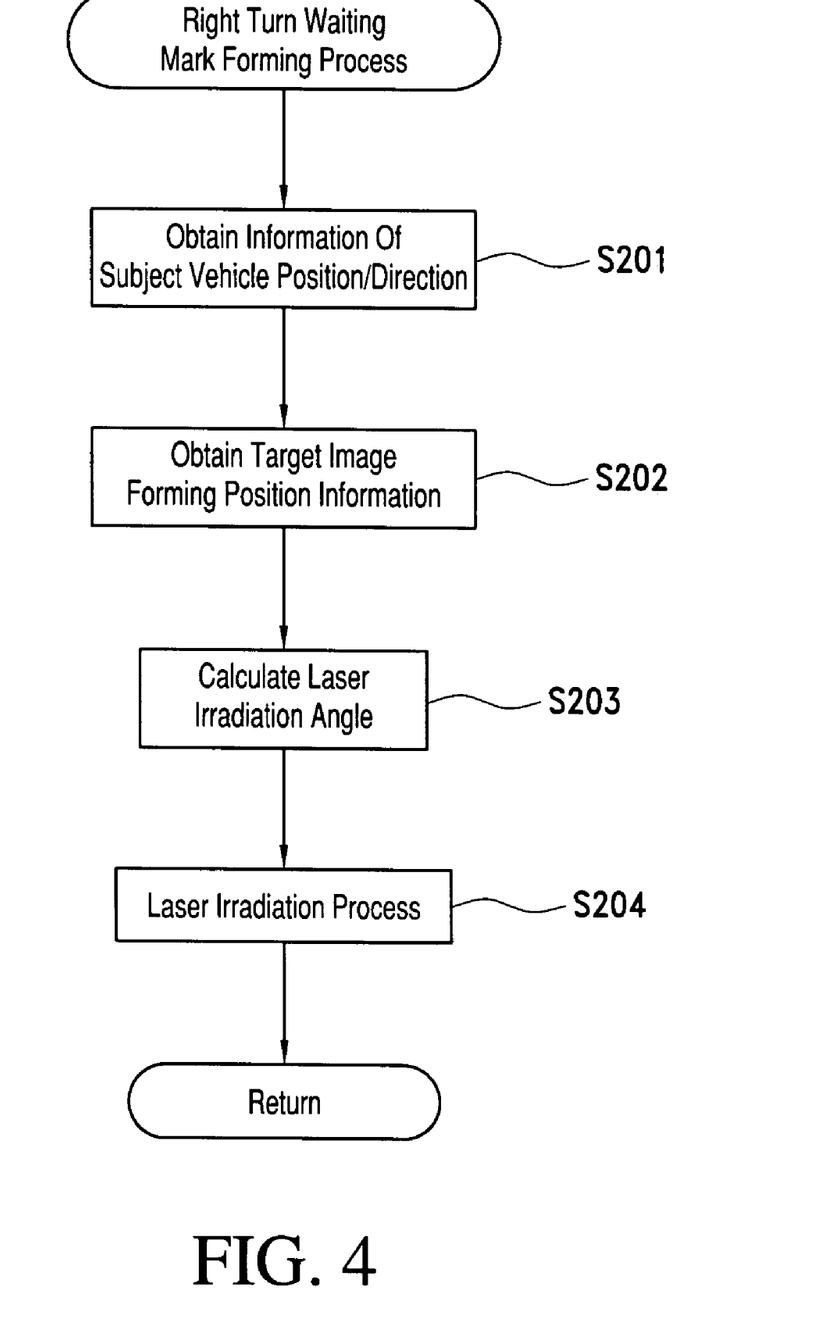
FIG. 4 is a flowchart of the "image forming process of right turn waiting mark" subroutine executed in step 20 shown in FIG. 2.
Figure 5:
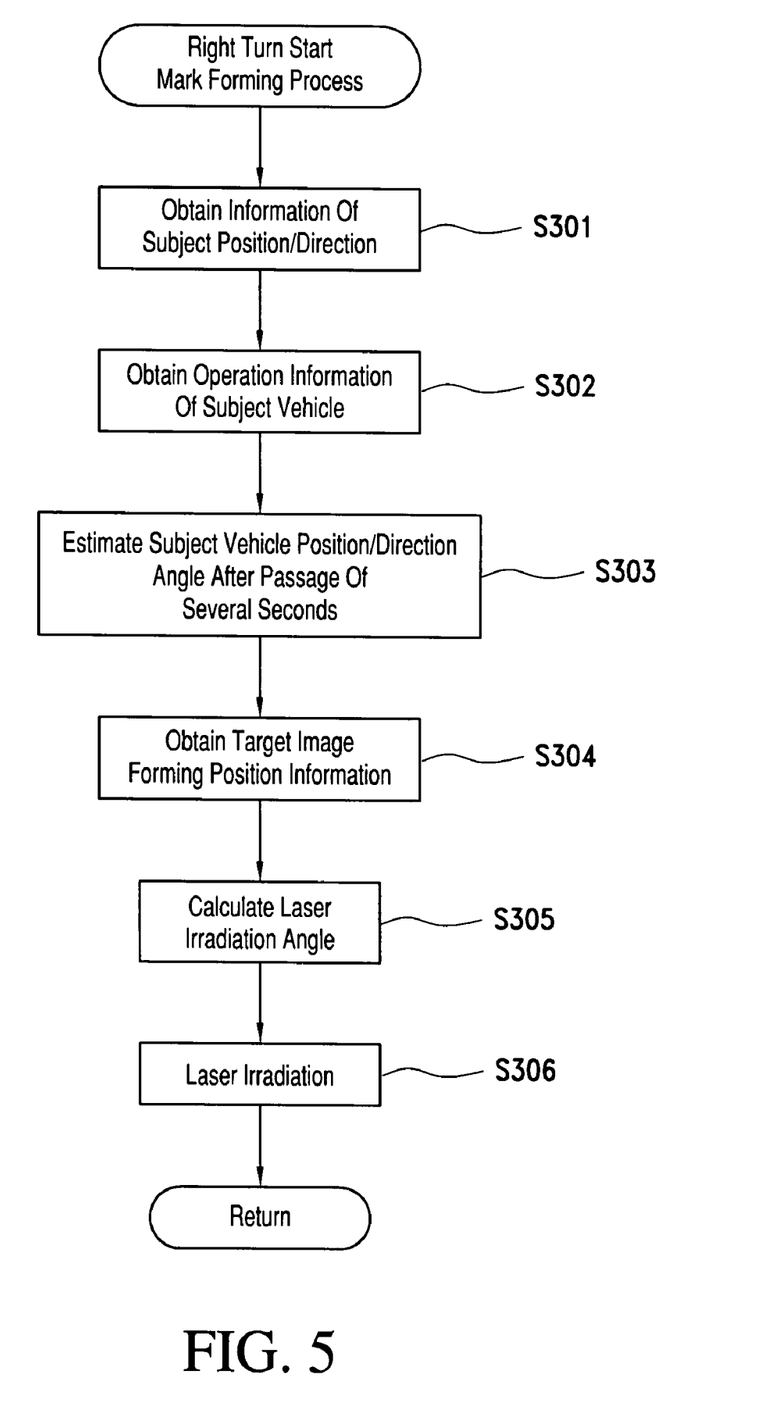
FIG. 5 is a flowchart of the "image forming process of right turn start mark" subroutine executed in step 23 shown in FIG. 2.
Figure 6:
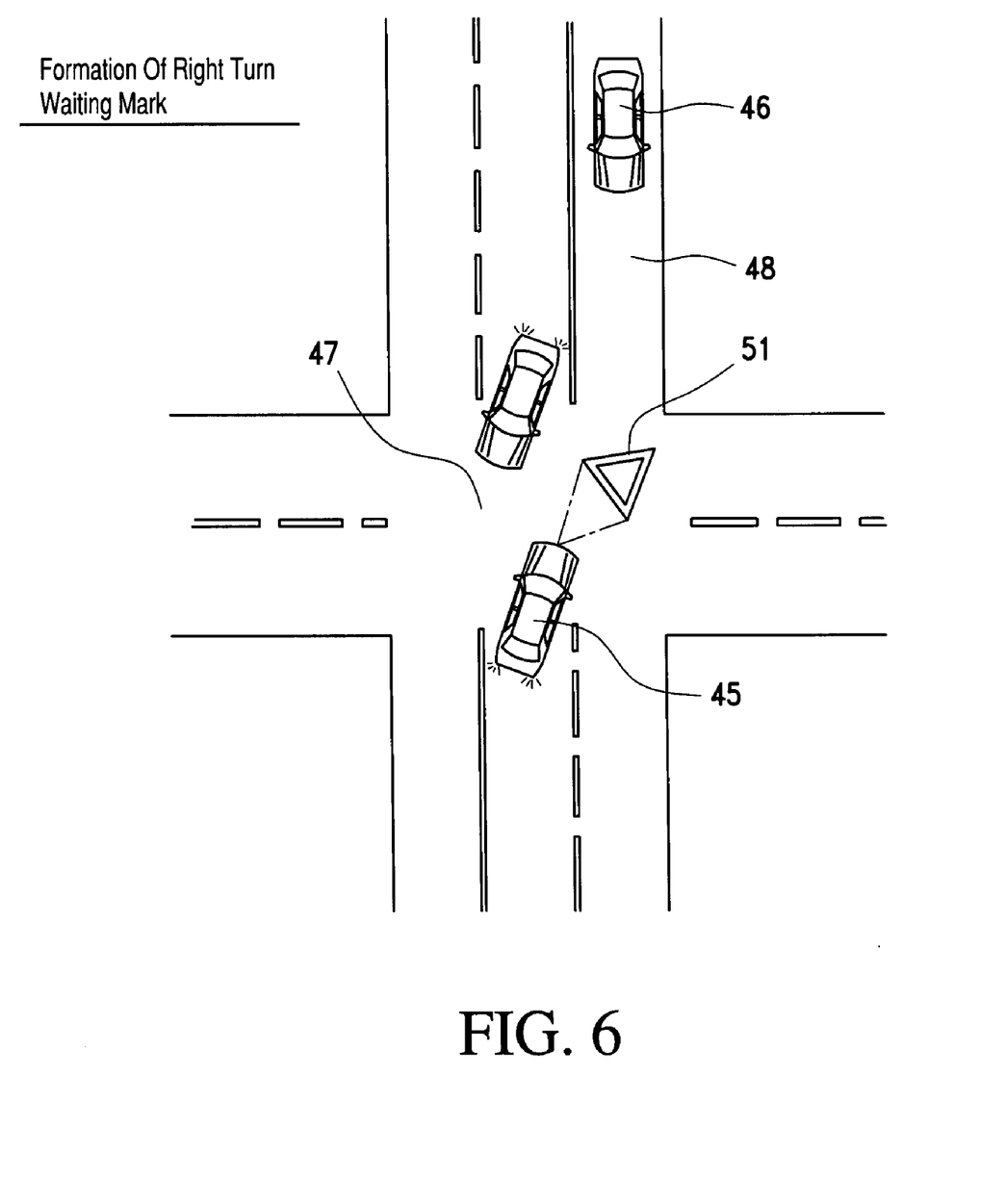
FIG. 6 is a plan view showing an example of the right turn waiting mark formed on the road surface of the opposing lane at the intersection.
Figure 7:
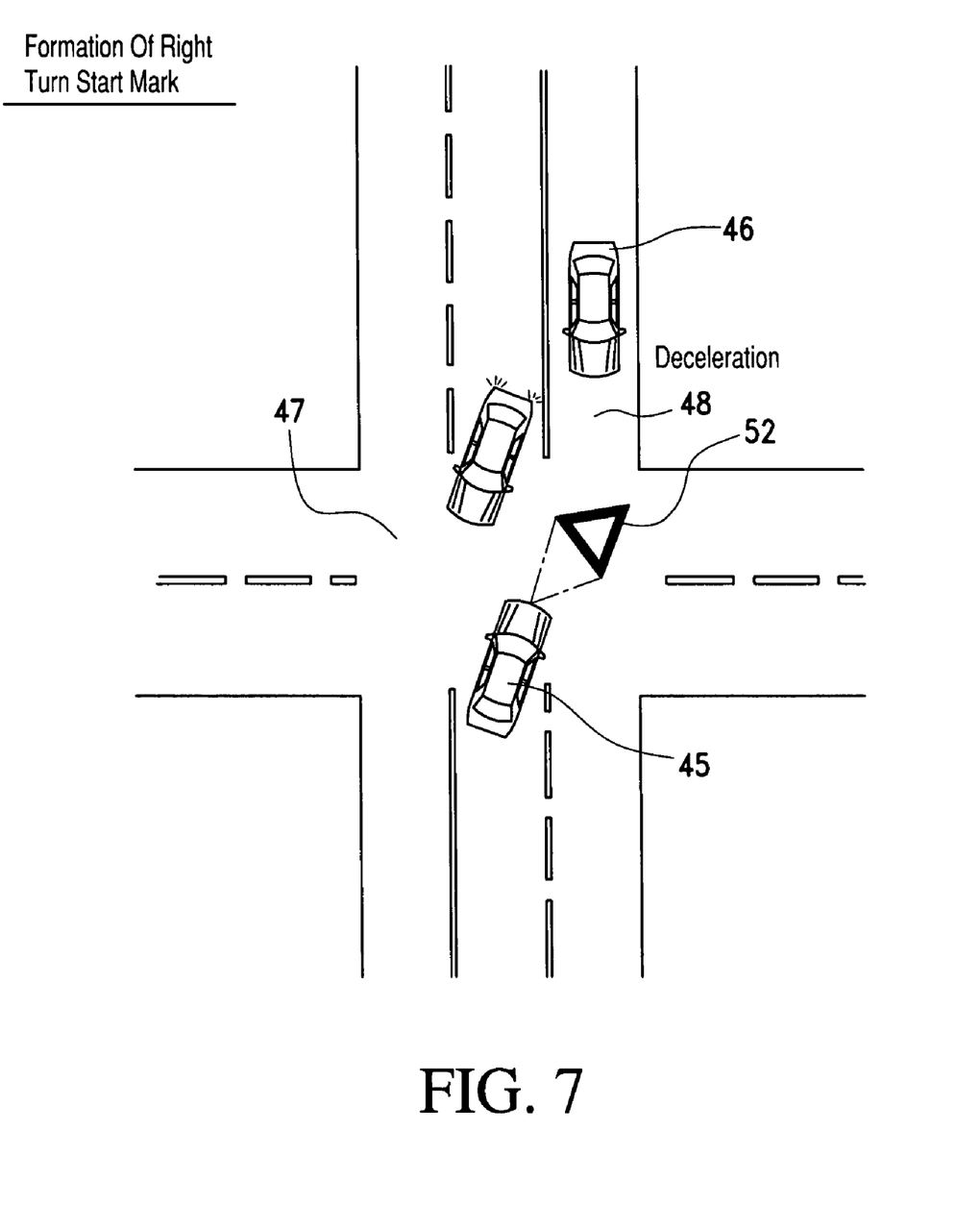
FIG. 7 is a plan view showing an example of the right turn start mark formed on the road surface of the opposing lane at the intersection.
Figure 8:
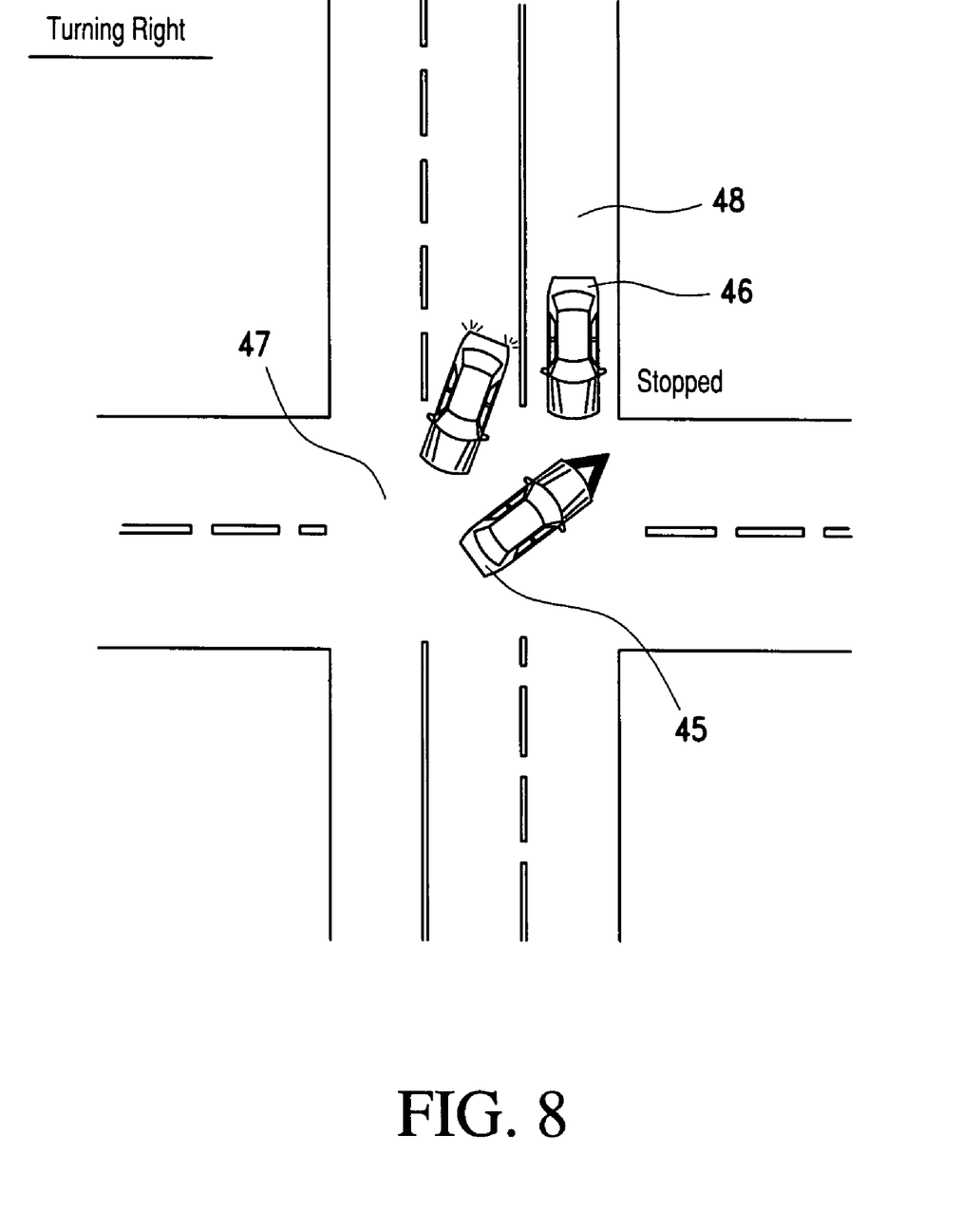
FIG. 8 is a plan view showing an example of a state where the host vehicle is passing the intersection.

FIG. 2 is a flowchart showing the laser image forming process executed by the navigation ECU 3 for forming the right turn waiting mark with the visually identifiable laser beam on the road surface of the opposing lane at the intersection when the host vehicle is stopped at the intersection waiting for turning right. FIG. 3 is a flowchart showing a subroutine as the "vehicle state determination process" executed in step 18 shown in FIG. 2. FIG. 4 is a flowchart of the "image forming process of right turn waiting mark" subroutine executed in step 20 shown in FIG. 2. FIG. 5 is a flowchart of the "image forming process of right turn start mark" subroutine executed in step 23 shown in FIG. 2. FIG. 6 is a plan view showing an example of the right turn waiting mark formed on the road surface of the opposing lane at the intersection. FIG. 7 is a plan view showing an example of the right turn start mark formed on the road surface of the opposing lane at the intersection. FIG. 8 is a plan view showing an example of a state where the host vehicle is passing the intersection. The programs shown in the flowcharts in FIGS. 2 to 5 are stored in the RAM or the ROM of the navigation ECU 3, and executed by the CPU.

Referring to FIG. 2, first, in step (hereinafter referred to as S) 11, the navigation ECU 3 allows the host vehicle position determination unit 32 and the host vehicle posture (orientation) determination unit 35 to detect the position and direction of the host vehicle and stores the coordinate data representing the host vehicle position (for example, data of latitude and longitude) and the host vehicle direction in the RAM. The navigation ECU 3 downloads the intersection data for the intersection ahead of the host vehicle in the traveling direction from the map information DB 33 into the RAM.

Subsequently, in S12, the navigation ECU 3 downloads the coordinate data representing the subject (host) vehicle position and the intersection data from the RAM again to determine whether or not the host vehicle has entered the intersection. If the host vehicle has not entered the intersection yet (NO in S12), the navigation ECU 3 executes S11 and the subsequent steps.

If the host vehicle has entered the intersection (YES in S12), the navigation ECU 3 proceeds to execute S13 where it is determined whether the host vehicle is going to turn right or left based on signals from the steering sensor 11 and the 3D acceleration sensor 16 and on the direction indicator information. If it is determined that the host vehicle is going to turn right, the "right turn flag" is downloaded from the RAM and set as ON, that is, the value "1" is substituted for the right turn flag, and stored in the RAM. If it is determined that the host vehicle is not going to turn right, the "right turn flag" is downloaded from the RAM and set as OFF, that is, the value "0" is substituted for the right turn flag, and stored in the RAM again. At the start-up of the engine, the right turn flag is set to OFF, that is, the value "0" is substituted for the right turn flag to be stored in the RAM.

Then in S14, the navigation ECU 3 downloads the right turn flag from the RAM to determine whether or not the right turn flag has been set to ON, that is, whether or not the host vehicle is going to turn right. If the right turn flag is set to OFF, that is, the right turn flag is set to "0" (NO in S14), the navigation ECU 3 determines that the host vehicle is not going to turn right, and executes S11 and the subsequent steps.

Meanwhile, if the right turn flag has been set to ON, that is, the right turn flag is set to "1" (YES in S14), the navigation ECU 3 determines that the host vehicle is going to turn right, and proceeds to execute S15. In S15, the navigation ECU 3 determines whether or not a vehicle that is going to turn is ahead of the host vehicle, based on the information derived from the front distance detection sensor 14. If it is determined that the vehicle ahead of the host vehicle is going to turn right, the "leading vehicle flag" is downloaded from the RAM and set to ON. That is, the value "1" is substituted as the leading vehicle flag, and stored in the RAM again. If it is determined that the vehicle ahead of the host vehicle is not turning right, the "leading vehicle flag" is downloaded from the RAM and set to OFF, that is, the value "0" is substituted as the leading vehicle flag, and stored in the RAM again. At the start-up of the engine, the leading vehicle flag has been set to OFF, that is, the value "0" is substituted as the leading vehicle flag and stored in the RAM.

Then in S16, the navigation ECU 3 downloads the leading vehicle flag from the RAM again to determine whether or not the leading vehicle flag has been set to ON, that is, there is now a leading vehicle intending to make a right turn. If the leading vehicle flag has been set to ON, that is, the leading vehicle flag has been set to the value "1" (YES in S16), the navigation ECU 3 proceeds to execute S17. In S17, the navigation ECU 3 allows the host vehicle position determination unit 32 and the host vehicle posture determination unit 35 to detect the host vehicle position and the host vehicle direction and stores the coordinate data (for example, data of latitude and longitude) representing the host vehicle position and the host vehicle direction in the RAM. The navigation ECU 3 again downloads the coordinate data representing the host vehicle position and the intersection data from the RAM, and determines whether or not the host vehicle has passed the intersection.

If it is determined that the host vehicle has passed the intersection (YES in S17), the navigation ECU 3 executes S11 and the subsequent steps again. However, if it is determined that the host vehicle has not passed the intersection (NO in S17), the navigation ECU 3 executes S15 and the subsequent steps.

If it is determined that the leading vehicle flag has been set to OFF in S16, that is, the leading vehicle flag has been set to "0" (NO in S16), the navigation ECU 3 proceeds to execute S18. In S18, the navigation ECU 3 executes the "vehicle state determination process" as the subroutine (see FIG. 3) to be described below.

Then in S19, the navigation ECU 3 determines whether or not the host vehicle is waiting to turn right in S18. Specifically, the navigation ECU 3 loads the "vehicle state flag" from the RAM to determine whether or not the vehicle state flag has been set to the value "1".

In S18, if the vehicle state is "unknown", the value "0" is substituted as the "vehicle state flag" and stored in the RAM. If the vehicle state represents "right turn waiting", the value "1" is substituted as the "vehicle state flag" and stored in the RAM. If the vehicle state is "right turn start", the value "2" is substituted teas the "vehicle state flag" and stored in the RAM. At the start-up of the engine, the value "0" has been substituted as the "vehicle state flag" and stored in the RAM.

If it is determined that the host vehicle has been waiting to make a right turn, that is, the vehicle state flag loaded from the RAM is the value "1" (YES in S19), the navigation ECU 3 proceeds to execute S20. In S20, the navigation ECU 3 executes the "right turn waiting mark forming process" to be described later as the subroutine (see FIG. 4) to form the right turn waiting mark having a predetermined shape (for example, triangle, ring, square) on the road surface of the opposing lane at the intersection with the visually identifiable laser with the predetermined color (for example, green), and further executes S18 and the subsequent steps again.

However, if it is determined that the host vehicle has not been waiting to turn right, that is, the vehicle state flag downloaded from the RAM is not the value "1" (NO in S19), the navigation ECU 3 proceeds to execute S21. In S21, the navigation ECU 3 determines whether or not it has been determined in S18 that the host vehicle is in the right turn start state. More specifically, the navigation ECU 3 downloads the vehicle state flag from the RAM again, and determines whether or not the vehicle state flag has been set to the value "2".

If it is determined that the host vehicle is not in the right turn start state, that is, the vehicle state flag loaded from the RAM has been set to the value "0" (NO in S21), the navigation ECU 3 determines that the vehicle state is "unknown", and proceeds to execute S22. In S22, the navigation ECU 3 allows the host vehicle position determination unit 32 and the host vehicle posture determination unit 35 to detect the host vehicle position and the host vehicle direction and to store the coordinate data representing the host vehicle position (for example, data for latitude and altitude) and the host vehicle direction in the RAM. Then the navigation ECU 3 loads the coordinate data representing the host vehicle position and the intersection data from the RAM to determine whether or not the host vehicle has passed the intersection.

If it is determined that the host vehicle has passed the intersection (YES in S22), the navigation ECU 3 executes S11 and the subsequent steps again. On the other hand, if it is determined that the host vehicle has not passed the intersection (NO in S22), the navigation ECU 3 executes S18 and the subsequent steps again.

If it is determined that the host vehicle is in the right turn start state in S21, that is, the vehicle state flag loaded from the RAM is the value "1" (YES in S21), the navigation ECU 3 proceeds to execute S23. In S23, the navigation ECU 3 executes the "right turn start mark forming process," subroutine (of FIG. 5) to be described later, to form the right turn start mark with the predetermined irradiation shape (for example, triangle, ring, or square) on the road surface of the opposing lane at the intersection with the visually identifiable laser beam with the color (red, for example) different from that of the right turn waiting mark.

Then in S24, the navigation ECU 3 directs the host vehicle position determination unit 32 and the host vehicle posture determination unit 35 to detect the host vehicle position and the host vehicle direction and to store the coordinate data representing the host vehicle position (for example, data of latitude and longitude) and the host vehicle direction in the RAM. The navigation ECU 3 downloads the coordinate data representing the host vehicle position, and the coordinate data of the target image forming position of the right turn start mark stored in the RAM in S23 to determine whether or not the host vehicle has passed the target image forming position of the right turn start mark. Specifically, if the coordinate data representing the host vehicle position reaches the point adjacent to the target image forming position of the right turn start mark (for example, the tip of the bumper of the host vehicle has reached a position 10 cm to 20 cm from the target image forming position), it may be determined that the host vehicle has passed the target image forming position of the right turn start mark. Then the "passage flag" is downloaded from the RAM and set to ON, that is, the value "1" is substituted teas the passage flag to be stored in the RAM again. If it is determined that the host vehicle has not passed the target image forming position of the right turn start mark, the "passage flag" is downloaded from the RAM and set to OFF. That is, the value "0" is substituted as the passage flag and stored in the RAM.

In S25, the navigation ECU 3 determines whether or not the host vehicle has passed the target image forming position of the right turn start mark, that is, it downloads the passage flag from the RAM again to determine whether or not the passage flag has been set to ON. If it is determined that the host vehicle has not passed the target image forming position of the right turn start mark, that is, the passage flag has been set to OFF (NO in S25), the navigation ECU 3 executes S18 and the subsequent steps again.

If it is determined that the host vehicle has passed the target image forming position of the right turn start mark, that is, the passage flag downloaded from the RAM has been set to ON (YES in S25), the navigation ECU 3 proceeds to execute S26. In S26, the navigation ECU 3 outputs a control signal that stops the laser output to the laser image forming unit 4, and executes S11 and the subsequent steps, after termination of formation of the right turn start mark, by outputting the control signal to stop the laser output to the laser image forming unit 4.

In the case where the host vehicle 45 has passed the target image forming position of the right turn start mark 52 as shown in FIG. 8, the navigation ECU 3 outputs the control signal to stop the laser output to the laser image forming unit 4 to terminate the image formation of the right turn start mark 52.

The "vehicle state determination process," the subroutine executed by the navigation ECU 3 in S18, will be described referring to FIG. 3.

Referring to FIG. 3, in S101, the navigation ECU 3 determines whether or not the host vehicle has been stopped based on various information data derived from the vehicle speed sensor 12 and the 3D acceleration sensor. If it is determined that the host vehicle has stopped (YES in S101), the navigation ECU 3 proceeds to execute S102. In S102, the navigation ECU 3 starts monitoring the movement of the driver's foot based on the information derived from the pedal operation state sensor 15 via the right turn waiting state determination unit 36.

In S103, the navigation ECU 3 determines whether or not the driver's foot has moved from the brake pedal to the accelerator pedal via the right turn waiting state determination unit 36 based on the information derived from the pedal operation state sensor 15. If it is determined that the driver's foot has been kept on the brake pedal, based on the information derived from the pedal operation state sensor 15 (NO in S103), the navigation ECU 3 proceeds to execute S104.

In S104, the navigation ECU 3 determines that the host vehicle is in the right turn waiting state to download the vehicle state flag from the RAM. The value "1" is substituted as the vehicle state flag and stored in the RAM again. The subroutine is then terminated and the ECU 3 returns to the main routine.

If it is determined that the driver's foot has moved from the brake pedal to the accelerator pedal by the right turn waiting state determination unit 36, based on the information derived from the pedal operation state sensor 15 (YES in S103), the navigation ECU 3 proceeds to execute S105. In S105, the navigation ECU 3 determines that the host vehicle is in the right turn start state, and downloads the vehicle state flag from the RAM. The value "2" is substituted as the vehicle state flag and stored in the RAM again. The subroutine then is terminated and the ECU 3 returns to the main routine.

In S101, if it is determined that the host vehicle has not stopped (NO in S101), the navigation ECU 3 proceeds to execute S106. In S106, the navigation ECU 3 determines whether or not the host vehicle has been in the right turn start state, that is, whether or not the driver's foot has not moved from the accelerator pedal to the brake pedal, that is, the driver's foot has been kept on the accelerator pedal, via the right turn waiting state determination unit 36. If it is determined that the host vehicle has been in the right turn start state, that is, it is determined that the driver's foot has been kept on the accelerator pedal (YES in S106), the navigation ECU 3 executes S105, terminates the subroutine and returns to the main routine.

If it is determined that the host vehicle is not in the right turn start state, that is, the driver's foot has not been kept on the accelerator pedal (NO in S106), the navigation ECU 3 proceeds to execute S107. In S107, the navigation ECU 3 determines whether or not the host vehicle is at a speed which allows the host vehicle to stop before entering the lane for opposing traffic at the intersection. If it is determined that the host vehicle is at a speed which does not allow it to stop before entering the lane for opposing traffic at the intersection (NO in S107), the navigation ECU 3 executes S105 again to terminate the subroutine and returns to the main routine.

Meanwhile, if it is determined that the host vehicle is at a speed allowing it to stop before entering the opposing traffic lane at the intersection (YES in S107), the navigation ECU 3 proceeds to execute S108. In S108, the navigation ECU 3 determines that the host vehicle has been neither in the right turn waiting state nor in the right turn start state, that is, in an unknown state. Then the vehicle state flag is downloaded from the RAM, and the value "0" is substituted as the vehicle state flag and stored in the RAM again. Then, the subroutine is terminated and the main routine is restarted.

The "right turn waiting mark forming process," as the subroutine executed by the navigation ECU 3 in S20, will now be described referring to FIGS. 4 to 6.

Referring to FIG. 4, first in S201, the navigation ECU 3 directs the host vehicle position determination unit 32 and the host vehicle posture determination unit 35 to detect the host vehicle position and the host vehicle direction and to store the coordinate data (for example, data of latitude and longitude), representing the host vehicle position and the host vehicle direction, in the RAM.

In S202, the navigation ECU 3 downloads the coordinate data for the opposing traffic lane at the intersection from the map information DB 33 and stores it in the RAM as the target image forming position information for forming the right turn waiting mark. The navigation ECU 3 downloads the coordinate data for the opposing traffic lane(s) at the intersection from the map information DB 33 and calculates the position of the subject vehicle relative to the road surface of opposing lane at the intersection and stores the relative position in the RAM as the target image forming position information for forming the right turn waiting mark.

In S203, the navigation ECU 3 downloads the target image forming position information for forming the right turn waiting mark from the RAM to allow the road surface irradiation position determination unit 31 to calculate the coordinate data of the target image forming position for forming the right turn waiting mark on the road surface of the opposing lane at the intersection and stores that calculation coordinate data in the RAM. The navigation ECU 3 downloads the coordinate data representing the host vehicle position, the host vehicle direction, and the coordinate data of the target image forming position from the RAM to allow the laser irradiation angle determination unit 34 to calculate the irradiation angle for forming the right turn waiting mark on the road surface of the opposing traffic lane at the intersection and stores the calculated angle in the RAM as the laser irradiation angle information.

Then, in S204, the navigation ECU 3 downloads the laser irradiation angle information from the RAM again, and the color data (for example, green) of the right turn waiting mark from the ROM and transmits that downloaded information to the laser image forming unit 4. The sub-routine then is terminated to return to the main routine. The laser image forming unit 4 allows the laser irradiation control unit 41 to control the irradiation angle of the laser beam based on the laser irradiation angle information, and forms the right turn waiting mark with the predetermined irradiation shape by irradiating the visually identifiable laser beam with the predetermined color through the laser output control unit 42 onto the road surface of the opposing lane at the intersection based on the color data of the right turn waiting mark and the like.

For example, referring to FIG. 6, the host vehicle 45 forms a triangle right turn waiting mark 51, having each side ranging from approximately 50 cm to 100 cm, with the green laser beam on the road surface of the opposing traffic lane 48 at the intersection 47. The driver of the vehicle 46 that travels in the opposing traffic lane 48 identifies the green right turn waiting mark 51 to easily recognize that the host vehicle 45 is in the right turn waiting state.

Referring to FIGS. 5, 7 and 8, the "right turn start mark forming process" executed by the navigation ECU 3 in S23 will be described.

As shown in FIG. 5, in S301, the navigation ECU 3 directs the host vehicle position determination unit 32 and the host vehicle posture determination unit 35 to detect the host vehicle position and the host vehicle direction and to store the coordinate data (for example, data of latitude and longitude) representing the host vehicle position and the host vehicle direction in the RAM.

In S302, the navigation ECU 3 obtains the operation information of the host vehicle including the steering information, the vehicle speed, and the tri-axial acceleration information from the steering sensor 11, the vehicle speed sensor 12, and the 3D acceleration sensor 16 and stores that obtained information in the RAM.

In S303, the navigation ECU 3 downloads the operation information of the host vehicle, for example, the coordinate data representing the host vehicle position, the host vehicle direction, the steering information, the host vehicle speed, and the tri-axial acceleration information from the RAM, and calculates the coordinate data of the estimated position of the host vehicle and the estimated direction of the host vehicle after traveling for several seconds (for example, 0.1 seconds to 0.5 seconds) or a predetermined distance (for example, 5 cm to 15 cm), and stores that collected operation information in the RAM for changing the irradiation angle of the laser beam.

In S304, the navigation ECU 3 loads the coordinate data of the opposing traffic lane at the intersection from the map information DB 33 and stores it in the RAM as the target image forming position information for forming the right turn start mark. The navigation ECU 3 may download the coordinate data of the opposing traffic lane at the intersection from the map information DB 33 to calculate the relative positional relationship between the host vehicle and the road surface of the opposing traffic lane at the intersection and stores that calculated relationship in the RAM as the target image forming position information for forming the right turn start mark. The target image forming position of the right turn start mark is substantially the same as the right turn waiting mark forming position (see S202 shown in FIG. 4).

In S305, the navigation ECU 3 downloads the target image forming position information for forming the right turn start mark from the RAM to allow the road surface irradiation position determination unit 31 to calculate the coordinate data of the target image forming position for forming the right turn start mark on the road surface of the opposing traffic lane at the intersection and stores that coordinate data in the RAM. The navigation ECU 3 downloads the coordinate data of the estimated position of the host vehicle, the estimated direction of the host vehicle, and the coordinate data of the target image forming position to calculate the irradiation angle for forming the right turn start mark on the road surface of the opposing traffic lane at the intersection, through irradiation of the laser beam from the laser beam irradiation angle determination unit 34, and stores that calculated angle in the RAM as the laser irradiation angle information.

Then, in S306, the navigation ECU 3 downloads the laser irradiation angle information from the RAM again, and further downloads the color data and the like for forming the right turn start mark with color (for example, red) different from that of the right turn waiting mark. The downloaded data is transmitted to the laser image forming unit 4 to terminate the sub-routine and to return to the main routine. The laser image forming unit 4 allows the laser irradiation angle control unit 41 to control the irradiation angle of the laser beam based on the laser irradiation angle information, and allows the laser output control unit 42 to irradiate the visually identifiable laser beam with a predetermined color on the road surface of the opposing traffic lane at the intersection so as to form the right turn start mark having the predetermined irradiation shape with a color different from that of the right turn waiting mark.

Referring to FIGS. 7 and 8, the host vehicle 45 starts forming the triangular right turn start mark 52, each side of which is approximately 50 cm to 100 cm, on the road surface of the opposing traffic lane 48 at the intersection 47 with the red laser beam, upon detection of the movement of the driver's foot from the brake pedal to the accelerator pedal. As the host vehicle 45 travels toward the opposing traffic lane at the intersection 47, the laser irradiation angle is changed at each interval of time, for example, 0.1 seconds to 0.5 seconds, or at each predetermined interval of distance (for example, 5 cm to 15 cm) such that the right turn start mark 52 is formed at substantially the same position on the road surface of the opposing traffic lane 48 at the intersection 47 with the red laser beam. The driver of the other vehicle 46 traveling in the opposing traffic lane 48 visually recognizes the change from the green right turn waiting mark 51 to the red right turn start mark 52 to easily understand that the state of the host vehicle 45 has changed from the right turn waiting state to the right turn start state. The other vehicle 46 can then decelerate just before entering the intersection 47 to safely stop at the stop position of the intersection 47.

When the host vehicle 45 has passed the target image forming position of the right turn start mark 52, or the point around the target image forming position of the right turn start mark 52, the laser image forming unit 4 is stopped to terminate formation of the right turn start mark 52.

The laser image forming unit 4 serves as an image forming device. The right turn waiting state determination unit 36 and the pedal operation state sensor 15 serve as the right turn start detection unit and the right turn waiting state detection unit. The navigation ECU 3 serves as the first and the second image forming control units. The navigation ECU 3 and the front distance detection sensor 14 form the leading vehicle detection unit. The navigation ECU 3, the steering sensor 11, the vehicle speed sensor 12, the 3D acceleration sensor 16, the host vehicle position determination unit 32, the map information DB 33, and the host vehicle posture determination unit 35 form the passage detection unit.

As has been described above, in the laser image forming system 1 according to the foregoing embodiment, in the ease where the right turn waiting state of the host vehicle stopped at the intersection is detected by the right turn waiting state determination unit 36, the navigation ECU 3 drives the laser image forming unit 4 to form the right turn waiting mark with the predetermined irradiation shape representing the right turn waiting state on the road surface of the opposing traffic lane in the intersection at which the host vehicle is stopped using the visually identifiable laser beam with a predetermined color (for example, green) (S18 to S20).

This allows the driver of a vehicle traveling in the opposite (opposing traffic) lane to visually identify the right turn waiting mark formed on the road surface of the opposing traffic lane in the intersection with the laser beam, to easily recognize that the host vehicle is in the right turn waiting state. It is possible to estimate the right turn of the host vehicle such that the other vehicle is capable of decelerating just before entering the intersection. This makes it possible to effectively avoid a collision or minor accident with the host vehicle.

In the case where the right turn waiting state determination unit 36 detects the change from the right turn waiting state where the host vehicle is stopped at the intersection to the right turn start state, the navigation ECU 3 drives the laser image forming unit 4 to form the right turn start mark representing the right turn start state of the host vehicle, instead of the right turn waiting mark, with a color (for example, red) different from that of the right turn waiting mark (for example, green), at substantially the same position in accordance with the traveling state of the host vehicle using the visually identifiable laser beam (S21 to S22).

This makes it possible to allow the driver of the vehicle in the opposing traffic lane to easily recognize that the right turn start mark with the predetermined irradiation shape with the color different from that of the right turn waiting mark has been formed instead of the right turn waiting mark. The change from the right turn waiting state, wherein the host vehicle has been stopped to the right turn start state may be easily recognized to allow the driver of the other vehicle to decelerate just before entering the intersection to safely stop to avoid collision or minor accident with the host vehicle.

If existence of the leading vehicle which is going to turn right ahead of the host vehicle is detected, the navigation ECU 3 does not form the right turn waiting mark (S15 to S17). The driver of the other vehicle in the opposing traffic lane easily recognizes that the host vehicle is going to turn right following the leading vehicle without waiting. This makes it possible to avoid collision or minor accident with the host vehicle.

If the existence of the leading vehicle which is going to turn right ahead of the host vehicle is detected, the navigation ECU 3 does not form the right turn start mark (S15 to S17). The driver of the other vehicle on the opposite lane easily recognizes that the host vehicle starts turning right following the leading vehicle. This makes it possible to avoid collision or minor accident with the host vehicle.

If the host vehicle has passed the target image forming position for forming the right turn start mark, or the point adjacent to the target image forming position, the navigation ECU 3 terminates formation of the right turn start mark. The driver of the other vehicle in the opposite lane easily recognizes that the host vehicle passing the intersection.

The present invention is not limited to the embodiment as described above, and may be improved and modified in various forms without departing from the scope of the present invention.

For example, in the aforementioned embodiment, the color of the right turn waiting mark is different from that of the right turn start mark (green and red). However, those marks may be formed with the visually identifiable laser beam with the same color by flashing the right turn start mark, whereby the driver of the other vehicle easily distinguishes the right turn waiting mark from the right turn start mark.

In the aforementioned embodiment, the right turn waiting mark and the right turn start mark are formed with the same shape (for example, green and red triangles, respectively). However, they may be formed into different shapes, for example, the right turn waiting mark may be formed as a green ring shape or square shape, and the right turn start mark may be formed as a red triangle. Alternatively, the right turn waiting mark and the right turn start mark may be formed in different shapes using the visually identifiable laser beam with the same color.

Besides the triangle, ring, and square shapes, each of the right turn waiting mark and the right turn start mark may be formed as points resulting from irradiation of the laser beam as a single image forming point, which may be regarded as the mark with the predetermined shape according to the present invention.

What is claimed is:

1. An image forming system for a host vehicle to alert another vehicle, traveling in an opposite lane in a direction opposite a direction of travel of the host vehicle, to a turn of the host vehicle at an intersection and across the opposite lane, the system comprising:
    an image forming unit that forms a mark with a predetermined shape on a road surface ahead of the host vehicle in the direction of travel of the host vehicle;
    a pedal operation sensor that detects position, relative to a pedal, of a foot of a driver of the host vehicle;
    a turn waiting detection unit that detects whether or not the host vehicle, stopped at the intersection, is in a turn waiting state;
    a turn start detection unit that detects, if the turn waiting detection unit has detected that the host vehicle is in the turn waiting state, whether or not the host vehicle has been changed from the turn waiting state to a turn start state based on a change in detected positions of the driver's foot; and
    a first image forming control unit that controls the image forming unit to form a turn start mark with the predetermined shape, indicating that the host vehicle is in the turn start state, on the road surface of the opposite lane and within the intersection to be entered by the host vehicle, if the turn start detection unit detects a change from the turn waiting state to the turn start state.

2. The image forming system according to claim 1, further comprising:
    a second image forming control unit that controls the image forming unit to form a turn waiting mark with a predetermined shape indicating that the host vehicle stopped at the intersection is in the turn waiting state on the road surface of the opposite lane and within the intersection, if the turn waiting detection unit detects that the host vehicle is in the turn waiting state.

3. The image forming system according to claim 2, wherein the first image forming control unit controls the image forming unit to form the turn start mark at a position where the turn waiting mark has been formed by the second image forming control unit, and to form the turn start mark with one of a color or shape different from that of the turn waiting mark.

4. The image forming system according to claim 1, further comprising a leading vehicle detection unit that detects whether or not a leading vehicle which is going to turn exists ahead of the host vehicle, wherein the first image forming control unit controls the image forming unit so as not to form the turn start mark when the leading vehicle detection unit detects the existence of the leading vehicle which is going to turn ahead of the host vehicle.

5. The image forming system according to claim 4, wherein the second image forming control unit controls the image forming unit so as not to form the turn waiting mark when the leading vehicle detection unit detects the existence of the leading vehicle which is going to turn ahead of the host vehicle.

6. The image forming system according to claim 1, further comprising a passage detection unit that detects whether or not the host vehicle has passed a point adjacent to an image forming position at which the turn start mark has been formed, wherein the first image forming control unit controls the image forming unit to terminate formation of the turn start mark in response to detection of passage of the host vehicle around the image forming position by the passage detection unit.

7. The image forming system according to claim 1, wherein the pedal operation sensor comprises a camera with image processing.

8. The image forming system according to claim 1, wherein:
    the turn waiting detection unit detects a turn waiting state when the host vehicle is stopped and the pedal operation sensor detects that the driver's foot remains on a brake pedal; and
    the turn start detection unit that detects a turn start state when, with the vehicle stopped, the pedal operation sensor detects a change in position of the driver's foot from the brake pedal to an accelerator pedal.

* * * * *